United States Patent
Coward et al.

(10) Patent No.: US 7,777,670 B2
(45) Date of Patent: Aug. 17, 2010

(54) MILLIMETRE AND SUB-MILLIMETRE WAVE ILLUMINATION SYSTEM

(75) Inventors: Peter R Coward, Malvern (GB); Neil A Salmon, Malvern (GB)

(73) Assignee: QinetiQ Limited, London (GB)

( * ) Notice: Subject to any disclaimer, the term of this patent is extended or adjusted under 35 U.S.C. 154(b) by 744 days.

(21) Appl. No.: 10/593,485

(22) PCT Filed: Mar. 24, 2005

(86) PCT No.: PCT/GB2005/001181
§ 371 (c)(1),
(2), (4) Date: Sep. 20, 2006

(87) PCT Pub. No.: WO2005/096013
PCT Pub. Date: Oct. 13, 2005

(65) Prior Publication Data
US 2007/0272880 A1 Nov. 29, 2007

(30) Foreign Application Priority Data
Apr. 2, 2004 (GB) ................. 0407511.5

(51) Int. Cl.
*G01S 13/88* (2006.01)
*G01S 7/35* (2006.01)
*G01S 13/89* (2006.01)
*H01Q 21/00* (2006.01)
*G01S 13/00* (2006.01)
*H01Q 21/06* (2006.01)
*H01Q 13/18* (2006.01)
*G01V 8/00* (2006.01)

(52) U.S. Cl. .................. 342/82; 342/175; 342/176; 342/179; 342/368; 342/376

(58) Field of Classification Search .............. 342/21, 342/22, 27, 28, 59, 61–68, 73, 74, 82–103, 342/147, 158, 175, 176, 179, 192–197, 368, 342/376, 171; 343/721, 767–786
See application file for complete search history.

(56) References Cited

U.S. PATENT DOCUMENTS
3,683,379 A * 8/1972 Saddler et al. .............. 343/721
(Continued)

FOREIGN PATENT DOCUMENTS
| GB | 589603 | 7/1943 |
| WO | 02/17231 A2 | 2/2002 |
| WO | 03/098741 A1 | 11/2003 |

OTHER PUBLICATIONS
P. K. Rekdal et al., "On the Preparation of Pure States in Resonant Microcavities"; Journal of Modern Optics; Jan. 10, 2004; vol. 51, No. 1; pp. 75-84; ISSN 0950-0340 print 1362-3044.*
(Continued)

*Primary Examiner*—Bernarr E Gregory
(74) *Attorney, Agent, or Firm*—Nixon & Vanderhye P.C.

(57) ABSTRACT

An improved millimeter wave illumination system includes at least one primary source of millimeter wave radiation, a reflecting surface and a baffle comprising a plurality of exit apertures arranged such that at least some of the radiation from the source is reflected from the reflective surface before proceeding to the baffle, characterized in that means are incorporated for generating a plurality of radiation field states within a pre-determined time interval. The baffle, source and reflector are preferably packaged into a container with the exit apertures providing an illumination output. The generation of the plurality of radiation field states provides an illumination at the illuminator output that is less spatially variable when integrated over the pre-determined time interval. Embodiments of the invention show means for generating the plurality of radiation field states including relative movement of the reflective surface, variable positioning of the source with respect to the reflective surface, and including multiple sources within a single system.

12 Claims, 5 Drawing Sheets

U.S. PATENT DOCUMENTS

| | | | | |
|---|---|---|---|---|
| 3,713,156 | A | * | 1/1973 | Pothier .................... 342/22 |
| 3,955,199 | A | * | 5/1976 | Hutzelman et al. .......... 342/171 |
| 4,187,507 | A | * | 2/1980 | Crane et al. ............... 342/376 |
| 4,630,053 | A | * | 12/1986 | Green et al. .............. 342/376 |
| 5,073,782 | A | * | 12/1991 | Huguenin et al. ........... 342/179 |
| 5,227,800 | A | * | 7/1993 | Huguenin et al. ........... 342/179 |
| 5,680,139 | A | * | 10/1997 | Huguenin et al. ........... 342/175 |
| 7,358,890 | B2 | * | 4/2008 | Price et al. ................ 342/82 |
| 2005/0168376 | A1 | * | 8/2005 | Coward et al. .............. 342/22 |

OTHER PUBLICATIONS

International Search Report of PCT/GB2005/001181, mailed Aug. 22, 2005.

GB Search Report of GB 0407511.5, mailed Aug. 17, 2004.

\* cited by examiner

MILLIMETRE AND SUB-MILLIMETRE WAVE ILLUMINATION SYSTEM

This application is the US national phase of international application PCT/GB2005/001181, filed 24 Mar. 2005, which designated the U.S. and claimed priority of GB 0407511.5, filed 2 Apr. 2004, the entire contents of each of which are hereby incorporated by reference.

BACKGROUND OF THE INVENTION

1. Field of Invention

This invention relates to systems and methods used for providing millimeter wave and sub-millimeter wave illumination of a scene. In particular, it relates to illuminators that are used primarily indoors, but also have utility in outdoor environments.

2. Discussion of Prior Art

Systems capable of producing images of a scene based on millimeter wave (or thereabouts) radiation emitted from the scene are becoming more commonplace as the technology used in such systems matures. These imaging systems are able to detect the energy levels at these wavelengths within a scene at a resolution fine enough to produce images of a quality suitable for many tasks. The images produced from such imagers effectively show the energy differences coming from different parts of the scene. To satisfactorily reproduce various elements of the scene there needs to be a sufficient illumination energy difference between these elements. If the system is being used outdoors then the energy difference between the sky, which appears cold and hence of low emissivity, and the scene, which will be typically at 270-300 Kelvin and hence of comparatively high emissivity, can be used to generate images having a good contrast. For indoor use, this is more of a problem, as typically all elements within the scene will be at a similar temperature.

In these circumstances it is normal to direct a source or sources of energy at the wavelength(s) of interest at the scene to be imaged, such that the scene may reflect some of this energy to the imager, and so distinguish the scene from its background. An illuminator designed for this purpose is disclosed in published PCT application, No. GB2003/001886. The illuminator disclosed therein provides a diffuse source of energy from a relatively large area, which results in a more even illumination of the scene being imaged, and helps to reduce problems such as glint and specular reflection, all of which are detrimental to the final image.

However, if the bandwidth of either the illuminator or the imager is small, then a speckle effect can sometimes be seen on the image. This can be detrimental to the overall image.

The object of the present invention is to at least alleviate the problems identified with the prior art.

SUMMARY OF THE INVENTION

According to the present invention there is provided a millimeter or sub-millimeter wave illumination system comprising:

at least one primary radiation source adapted to emit radiation at one or more wavelengths of interest in at least one radiation field state;

a baffle comprising a non transmissive surface and having positioned therein a plurality of transmissive exit apertures;

a surface reflective at millimeter or sub-millimeter wavelengths for inducing a plurality of radiation paths between the source and the baffle;

characterised in that the system further incorporates means for generating a plurality of radiation field states in a predetermined time interval.

The reflective surface is arranged such that at least a part of the radiation exiting the primary source will be reflected from the reflective surface before exiting through the exit apertures.

The speckle effect observed with the prior art has been found to be caused by a noise-like spatial variation in the output power from the illuminator. This variation tends to remain temporally static, and so presents an uneven illumination to the scene. This is believed to be caused by the radiation exiting from the various exit apertures of the baffle at fixed, but essentially random phases, combining to produce a radiation pattern in a similar manner to a large phased array antenna where the phase of each element is set randomly.

The problem has been found to become more pronounced as the bandwidth of the illumination system, or an imaging system using such illuminators, reduces. Of course, if the imaging system uses a narrower bandwidth than that produced by the illumination system, then the energy produced by the illumination system outside of the imaging system bandwidth will play little part in the imaging process.

As the bandwidth is reduced the coherence of the radiation emitted from the exit apertures tends to increase, which in turn increases the amount of spatial variation in output power of the illuminator. Conversely, at larger bandwidths, the spatial variation in output power of the illuminator decreases. This can be understood by notionally regarding a wide bandwidth output as a set of different narrow bandwidth outputs. As the spatial variations at each bandwidth will be different, the integration of several such outputs tends to result in an averaging, or smoothing of the overall output from the illuminator.

At lower bandwidths, the applicant has realised that by generating a plurality of different radiation field states as defined herein within a pre-determined time interval the amount of spatial variation in output power seen by an associated imager is reduced. The plurality of different modes may be generated by disturbing the electromagnetic field pattern before the radiation has exited the exit apertures over a pre-determined time interval. If this is done, then the relative phases of the radiation emanating from the exit apertures will change and so the spatially noise-like radiation pattern from the illuminator will also change.

Alternatively, the plurality of different radiation field states may be generated simultaneously. This may be done by, for example by incorporating a plurality of primary sources towards the baffle and reflector, or alternatively may be done using a single source by radiating from towards the baffle and reflector at least a first and a second location, whilst arranging that radiation at the first location is incoherent with that at the second location. This may be achieved by incorporating an appropriate relative time delay between radiation reaching the two locations from the source.

Preferably the system is arranged to generate the radiation field states such that a plurality of modes are generated within a basic integration time period of an associated imager viewing the scene. In general the integration time period will correspond to the time taken for the imager to measure a pixel of information. For certain classes of imager however, particularly those that comprise an unscanned staring array of receive elements, this integration time may also correspond to the time taken to record a whole image frame. Preferably the system is arranged to generate radiation field states such that during each basic integration time period of the imager, the scene is illuminated by at least two, such as at least four, such as at least eight radiation field states from the illuminator. In this manner the changing modes will tend to produce an averaging effect, wherein the apparent illumination when integrated over the basic integration time of the imager will appear to be relatively constant.

A preferred system will incorporate the baffle and the reflecting surface into a container, with radiation from the source or sources being emitted into the container.

The means for generating a plurality of radiation field states over a pre-determined time interval may comprise a means for changing the internal dimensions of the container. As at least some of the radiation that emerges from the exit apertures will be reflected from reflective material on the inside of the container, then changing the dimensions of the container by a sufficient extent will change the properties of the reflected radiation, and so change the radiation field state within the container.

Alternatively or as well, the means for generating a plurality of radiation field states over a pre-determined time interval may comprise a movable structure within the container, that disturbs the electromagnetic field, and so changes the radiation field state within the container. The moving structure may be reflective, absorptive or a dielectric.

Alternatively or as well, the means for generating a plurality of radiation field states over a pre-determined time interval may comprise changing the effective position within the container of the output of the primary source. This may be done by physically moving the source output within the container, or may be done by switching the radiation from the primary source through to different outputs positioned at different positions within the container.

Alternatively or as well, the means for generating a plurality of radiation field states over a pre-determined time interval may comprise a plurality of, effectively, single sources, all simultaneously generating a radiation field state. These may be physically independent sources, or may comprise a single source with a plurality of outputs, each arranged to be incoherent with respect to each other.

Note that in the context of the current description a transmission mode shall be taken to be the pattern at a given instant of the electromagnetic field distribution on either side of the baffle, generated by effectively a single source.

Note that in the context of the current description a resonant field state shall be taken to be a standing wave pattern of electromagnetic wave radiation set up between the reflective surface, the source and the baffle and extending through the apertures of the baffle, as defined by the relative positions of the surface, source and baffle and the frequencies of the radiation, generated effectively by a single source.

Under most circumstances a single source will generate a radiation field state that can remain substantially constant over a period of time longer than that of the basic integration time. However, a physical single source can act as effectively more than one source in terms of radiation field states generated by means of having multiple outputs that are delayed with respect to each other by more than a coherence length of the radiation being emitted. In this instance, more than one radiation field state will be generated.

According to a further aspect of the current invention there is provided a method of generating millimeter or sub-millimeter wave illumination comprising the steps of:

feeding millimeter or sub-millimeter wave radiation from at least one primary source towards a reflecting surface and a baffle, the baffle comprising a non transmissive surface and having positioned therein a plurality of transmissive exit apertures, such that the reflecting surface induces a plurality of radiation paths between the source and the baffle;

generating a plurality of radiation field states between the source and the exit apertures over a pre-determined time interval.

BRIEF DESCRIPTION OF THE DRAWINGS

The invention will now be described in more detail, by way of example only, with reference to the following Figures, of which.

DETAILED DISCUSSION OF EMBODIMENTS

Figure 1:
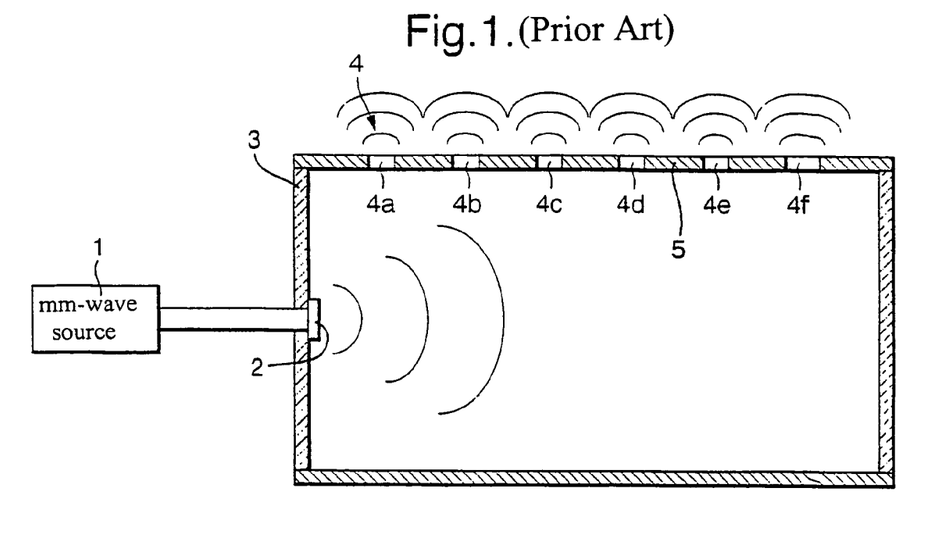
FIG. 1 diagrammatically illustrates a prior art illuminator system.

FIG. 1 shows a mm-wave primary source 1 such as an amplified noise source having an output 2 positioned within a container 3. The container 3 has a metallic internal surface, which is generally reflective at wavelengths produced by the primary source 1. At least one side 5 of the container 3 is formed with a baffle comprising an array of circular through holes or apertures 4, six of which (4a-4f) are visible in FIG. 1. The array will generally comprise a two dimensional array. The output 2 of the source 1 is positioned within the container 3 such that most of the radiation emitted from the output 2 undergoes at least one reflection from the reflective internal surface of the container 3 before exiting the container from the exit apertures 4.

The complex nature of the path taken by most of the radiation within the container 3 ensures that, for radiation having a high bandwidth (typically 5-10 GHz) there is a sufficient degree of incoherence of the radiation exiting any adjacent apertures. This helps to provide a spatially substantially constant level of illumination. As the system bandwidth falls however, the coherence length of the radiation increases, meaning that the degree of coherence of the radiation exiting any adjacent apertures will increase, leading to spatial variations in the level of illumination delivered by the illumination system.

Figure 2:
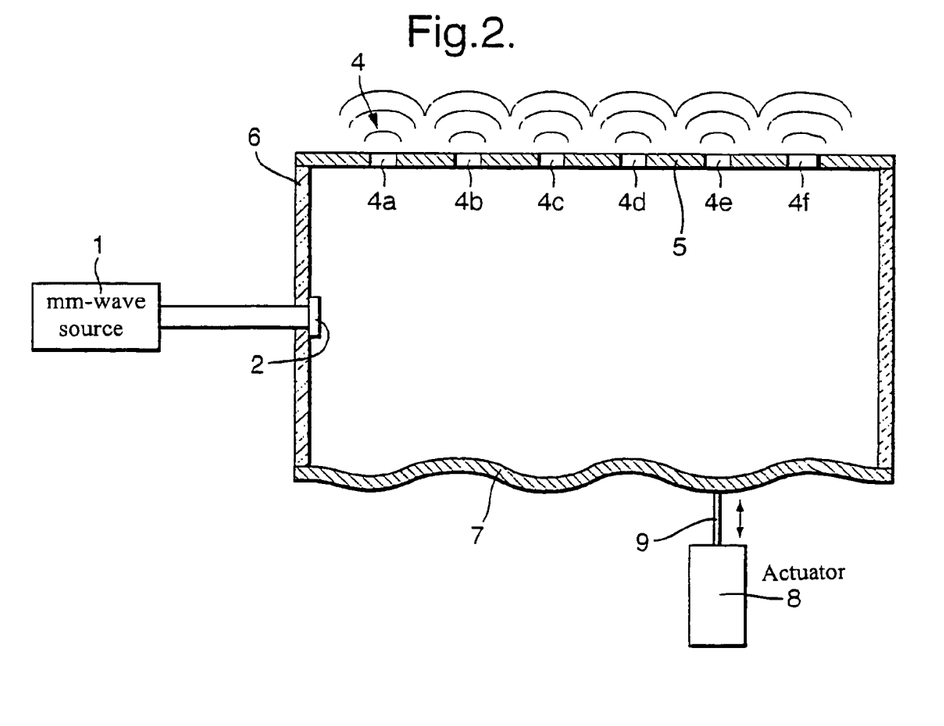
FIG. 2 diagrammatically illustrates a first embodiment of the current invention wherein a container housing the output of a primary source is arranged to have variable internal dimensions.

FIG. 2 shows a first embodiment of the current invention. Primary source 1 is connected to container 6 such that the output of source 1 is within the container 5, as shown in FIG. 1. The container 6 is generally similar to that shown in FIG. 1 but is arranged such that one internal wall 7 is able to flex when driven by an actuator 8. Actuator 8 has a connection rod 9 coupled to the wall 7, and this connection rod 9 moves in and out as indicated by the arrows. Such movement of the rod 9 will cause the wall 7 to move, as shown in exaggerated form in FIG. 2. Typically, flexure of the wall 7 of even as little as a millimeter is sufficient to change the radiation field state or states within the container enough to have the effect of changing the radiation power spatial variation from the illumination system. Although actuator 8 is shown positioned outside the container 6, it may equally well be positioned within the container 6.

The actuator is preferably arranged to flex the wall 7 repeatedly at a rate such that the modes change a plurality of times within a basic integration time period of an associated imager. The different spatial patterns created by the flexure will then be integrated by the detectors within the imager itself, leading to an averaging of the spatial variation, and therefore no additional processing will be required within the imager.

If a change in the modal structure of the radiation happens only once for each integration time period of the imager, then a plurality of images can be recorded and digitally processed to integrate the series of images. This is not preferred however as it will reduce the effective frame rate of the imaging system, and also require additional processing to be carried out.

Figure 3:
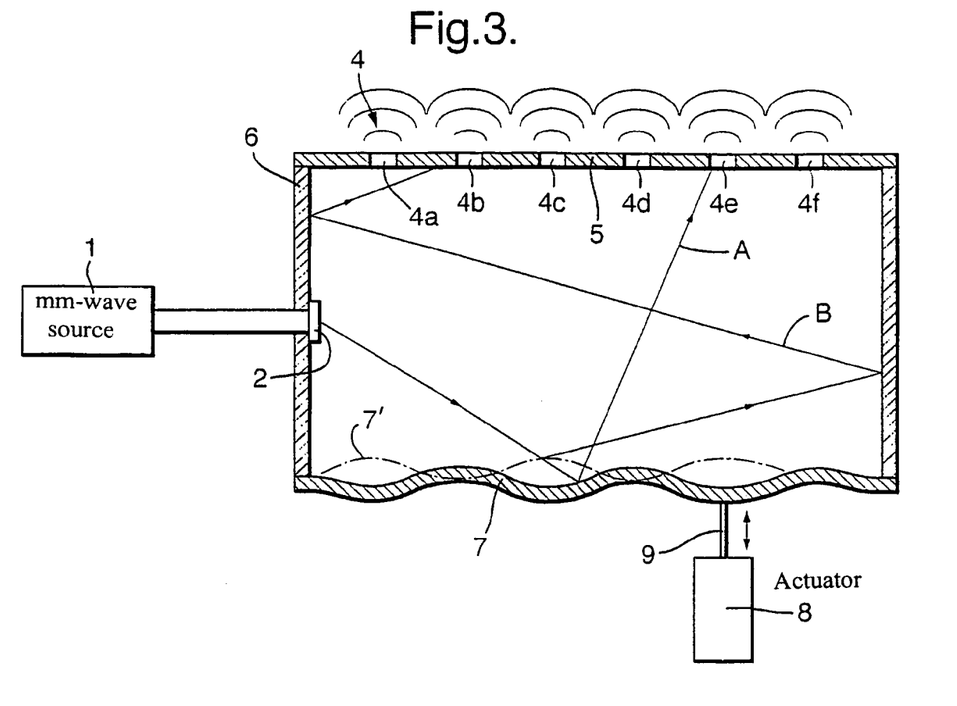
FIG. 3 diagrammatically illustrates how changes to the internal geometry of the container of the first embodiment can result in a differing spatial illumination variation.

FIG. 3 shows two possible paths of waves within the container 6 emitted from the output of primary source 1 (as shown in FIG. 2), the waves being emitted with a short time interval between each during which the wall 7 has flexed due to the movement of actuator 8. Path A shows the direction of a wave at a given instant reflecting from wall 7, the wall being moved by actuator 8. Path B, initially following the same path as path A hits the same part of the wall 7' at a later instant, and gets reflected in a different direction due to the different position and/or angle of that part of the wall 7. Although a simplistic representation, FIG. 3 shows how a relatively slight movement of wall 7 can have significant effects on the resultant spatial illumination pattern.

Figure 4:
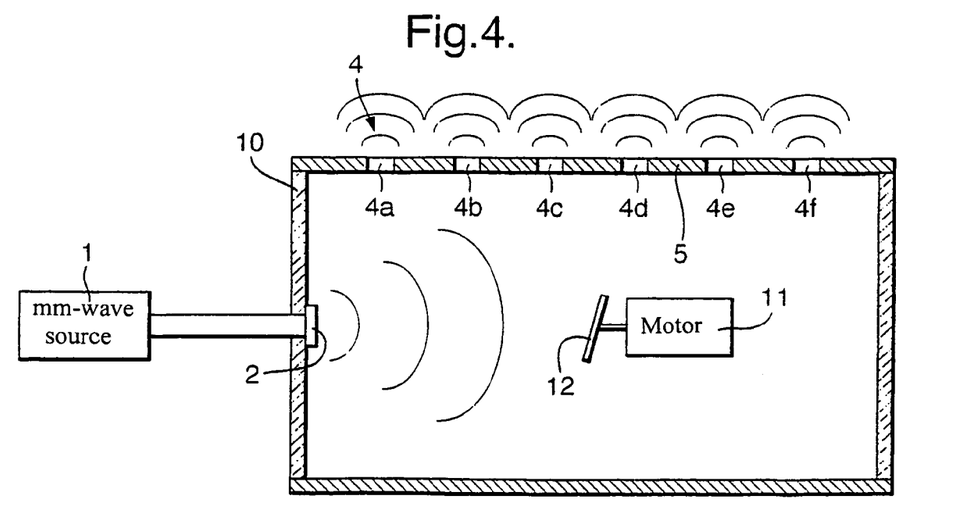
FIG. 4 diagrammatically illustrates a second embodiment of the current invention wherein a container housing the output of a primary source incorporates a moveable structure for disturbing an electromagnetic field within the container.

FIG. 4 shows a second embodiment of the current invention. Here, a primary source 1 again has an output 2 that feeds into a container 10. The container 10 is similar to that shown in FIG. 1, having exit apertures 4, and metallic inside walls. However, in this embodiment the container 10 also contains an electric motor 11 coupled to a skew-mounted metallic disk 12. The disk 12 is mounted such that it is in the path of at least some of the radiation from output 2. In practice, the disk can be mounted in any convenient location within the container 10.

The motor 11 is arranged to rotate the disk 12 when the illuminator is in use. Radiation that hits the disk will then be reflected away according to the position of the disk at that instant. As the disk rotates the radiation will reflect within the container 10 in different modes, and so the illumination spatial variation will be continuously changing. The motor is preferably arranged to rotate at a rate high enough to ensure that the modal change within the container 10 results in changes to the spatial variation of the illuminator output in a time shorter than the basic integration period of the associated imager.

Although FIG. 4 shows a motor coupled to a skew-mounted reflector 12, the scope of the invention is broad enough to encompass other means of "stirring" the modes within the container 10. For example, the reflector 12 can be replaced with a skew mounted dielectric slab, or even an absorber. All of these will affect the modal structure present in the container. Alternatively, the motor 11 and reflector 12 can be replaced with a mirror, or dielectric, or absorber attached to a linear actuator similar to actuator 8 in FIG. 2.

Figure 5:
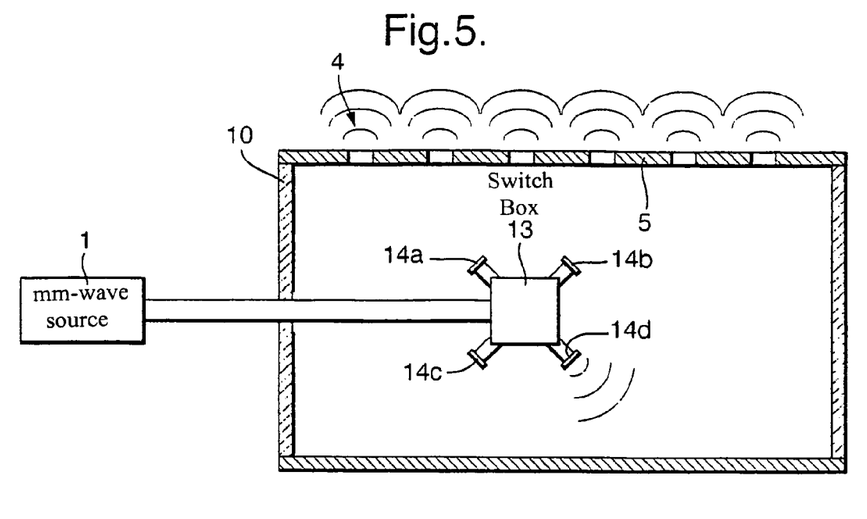
FIG. 5 diagrammatically illustrates a fourth embodiment of the current invention wherein a primary source within a container is arranged to have a plurality of outputs along with switching means for selecting a particular output.

FIG. 5 shows a fourth embodiment of the current invention. A primary source 1 is shown connected to a container 10, the container 10 being generally similar to that of the container 10 of FIG. 4. The output of source 1 feeds into a millimeter wave switch box 13 that has four individual outputs 14a-14d. Switching circuitry within the switch box is able to select which of the four outputs 14 the energy from the source 1 is directed towards. The switch box 13 is preferably a P.I.N diode switched device, as this is capable of switching very rapidly. Millimeter wave switches suitable for this application are manufactured by Millitech, based at Northampton, Mass. 01060, USA. Electromechanical switches are also suitable for implementing this embodiment, but cannot switch as rapidly.

In use, the primary source 1 provides energy at the wavelength of interest to the switch box 13 which, at any given time, is arranged to direct the energy to one of the four outputs 14. Output 14d is shown emitting radiation in FIG. 5. The switch box is arranged to switch the radiation from the source 1 through to each output 14a-14d in turn. As each output 14a-14d are in separate locations then the radiation field states within the container 10 for each output 4a-4d will generally be different, and so will result in a different spatial variation on the output of the illuminator. If the switch is arranged to cycle radiation through every output 4a-4d at least once during a basic integration time period of an associated imager, then these different spatial variations on the output of the illuminator will tend to be averaged in the imager, as takes place with the other embodiments of the invention discussed herein.

It has been found convenient with the implementation of this embodiment of the invention to put variable attenuators on each the outputs 14a-14d. This is because the output power radiated by the illuminator system can vary slightly depending upon which output 14a 14d is currently active. The attenuators allow the output power from each output 14a-14d to be tuned such that a more uniform output is obtained from the illuminator system.

Figure 6:
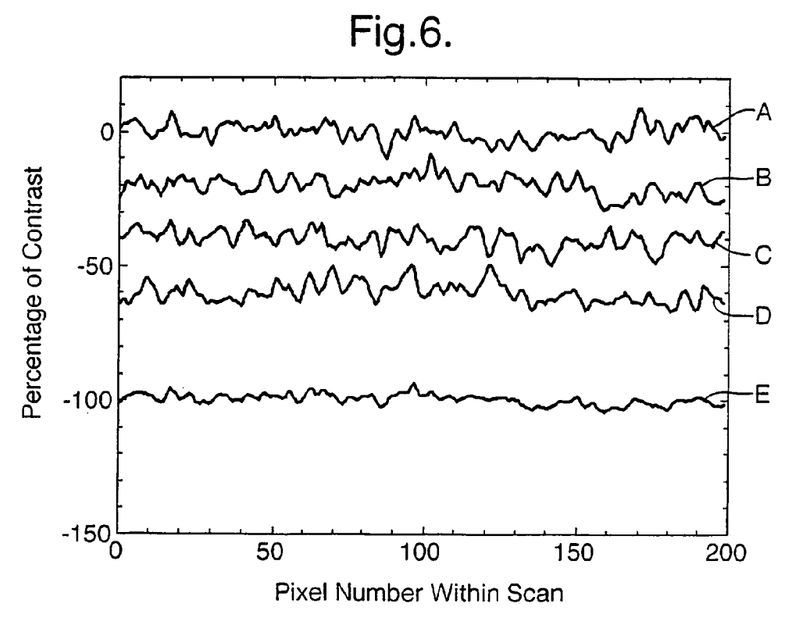
FIG. 6 shows a graph of the spatial variation in illumination power seen for various individual output positions of a primary source within a container, along with the sum of these.

FIG. 6 is a graph showing the results from the fourth embodiment. The graph indicates the percentage contrast measured on an imaging system with horizontal position in an image, indicated by pixel position. The image from which the data is taken is of a uniformly reflecting scene illuminated by the illuminator of the fourth embodiment, as illustrated in FIG. 5. Thus the graph shows the spatial variation in illumination of the scene Five traces are shown. Traces A, B, C and D equate to the image contrast when the scene is illuminated by the four individual outputs 14a, 14b, 14c and 14d respectively of the fourth embodiment. Trace E is a measurement taken by the imager of the scene illuminated by all four outputs in turn, each for a quarter of the measurement time accorded to traces A, B, C and D. Note that the traces A, B, C, D, E have been repositioned in absolute terms to make the graph clearer, and so their positions on the y-axis of the graph are not meaningful in terms of indicating absolute power levels. However, the y-axis is useful for seeing the amount of contrast variation within a single trace.

By merely looking at the traces it can be seen that the amount of spatial variation in illumination is similar for each of the traces A, B, C, D, but that the exact form of these traces is different in each case. The variation in trace E, where all four individual outputs 14a, 14b, 14c and 14d were used to illuminate the scene, show a much reduced spatial variation in illumination intensity, and thus a much more even illumination of the scene. The variation reduction has been calculated to be proportional to √n, where n is the number of individual illuminators used to illuminate the scene. The measured results match this theoretical prediction. This equation has been found to hold more generally for the other embodiments also, where n equates to the number of independent illumination patterns produced within the basic integration time of an associated imager.

Figure 7:
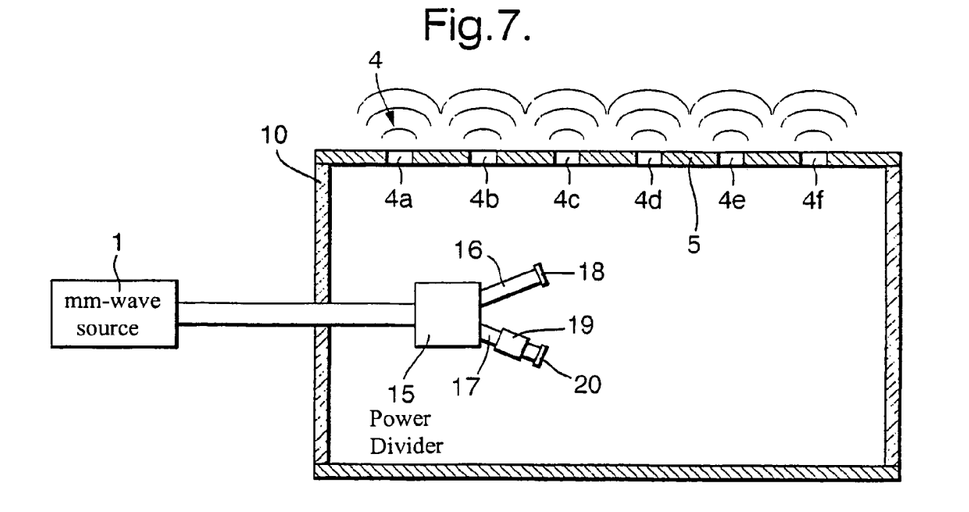
FIG. 7 diagrammatically illustrates a fifth embodiment of the current invention wherein a primary source is arranged to have a plurality of outputs, continuously providing energy, wherein one or more of the outputs incorporates phase shifting means.

FIG. 7 shows a fifth embodiment of the current invention. A primary source 1 is shown connected to a container 10, the container 10 being generally similar to that of the container 10 of FIG. 4. The output of source 1 feeds into a power divider 15, that splits the radiation from the primary source 1 into a first path 16 and a second path 17, each having approximately half the power of the original source. Radiation in the first path 16 is emitted into the container 10 as normal, through port 18. Radiation in the second path 17 passes through a variable phase shifter 19 before exiting through port 20.

The variable phase shifter is arranged to rapidly and continuously vary the phase of the radiation passing through it. The radiation from the two ports 18, 20 will combine vectorially within the container 10 to effectively steer the radiation in a particular direction within the container 10, and so produce, at a given instant, a radiation field state. Shortly afterwards, the phase shift induced into one path 17 of the radiation will steer the radiation in a different direction, and so result in a different radiation field state within the container 10. Each direction steered will generally result in a different radiation pattern produced by the illumination system, leading to the benefits discussed above. Similar embodiments may incorporate more than two ports 18, 20, and more than one phase shifter 19.

Figure 8:
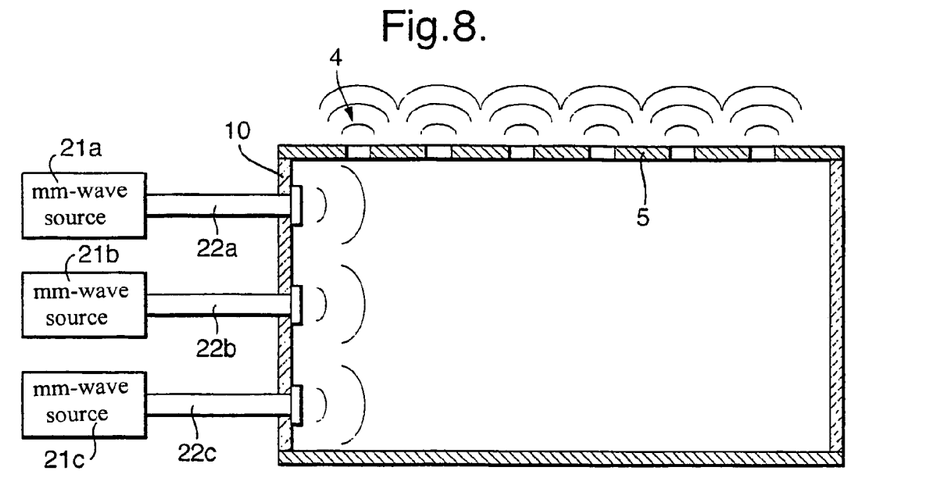
FIG. 8 diagrammatically illustrates sixth embodiment of the current invention, wherein multiple independent sources are employed.

FIG. 8 shows a sixth embodiment of the current invention. A container 10 is shown, generally similar to the container 10 of FIG. 4. However, instead of a single primary source feeding energy into the container 10, three independent primary sources 21a, 21b, 21c are arranged to feed energy into the chamber 10. The sources 21 are arranged to work simultaneously, so that all three may radiate energy into the container 10 at a given instant. The power of each source 21a, 21b, 21c may be adjusted such that the output power of the illuminator due to each source 21a, 21b, 21c is substantially equal. This may be achieved by incorporating attenuators into the feeds 22 of the sources, or by any other suitable means. As the sources 21 are mutually incoherent, then each will be associated with its own spatial variation on the output of the illuminator, but each such variation will be different. The superposition of the three spatial variations will tend to smooth the overall output power as described in relation to other embodiments above.

Figure 9:
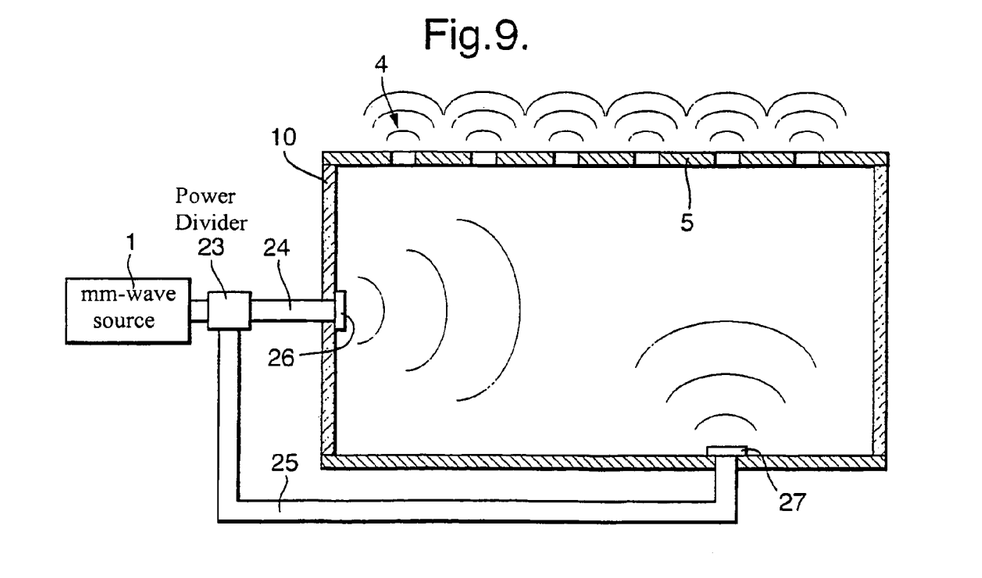
FIG. 9 diagrammatically illustrates a seventh embodiment of the current invention wherein a single source is operated so as to effectively act as a plurality of sources.

FIG. 9 shows a seventh embodiment of the current invention. A primary source 1 is shown connected to a container 10, the container 10 being generally similar to that of the container 10 of FIG. 4. The output of source 1 feeds into a power divider 23, that splits the radiation from the primary source 1 into a first waveguide path 24 having exit port 26 and a second waveguide path 25 having an exit port 27, each having approximately half the power of the original source. The length of the path 25 is longer than that of the path 24, so as to introduce a time delay between radiation exiting from exit port 26 and that exiting from exit port 27. This time delay must be sufficiently large such that radiation exiting from exit port 26 is incoherent with respect to that exiting from exit port 27. In practice, this means that the distance difference between the two paths 24, 25 should be greater than the coherence length of the radiation when travelling in the waveguide paths 24, 25, and this coherence length is dependent upon the system bandwidth.

The effect of the arrangement of FIG. 9 is to make the radiation exiting ports 26 and 27 behave as if it is derived effectively from independent sources. Thus, the benefits of the multiple source approach as described in the embodiment of FIG. 8 are gained using only a single source.

The skilled person will be aware that other embodiments within the scope of the invention may be envisaged, and thus the invention should not be limited to the embodiments as herein described. For example, in addition to the embodiments already described, the plurality of radiation field states may be generated in a pre-determined time by varying the physical characteristics of the baffle. This may be achieved by providing exit apertures that may be dynamically opened and closed within the pre-determined time.

The invention is applicable to illumination systems for wavelengths within the millimeter wavelength region and also in the sub-millimeter wavelength region extending up into the terahertz frequency region, and any necessary modifications for use at different wavelength regions will be obvious to those normally skilled in the art.

The invention claimed is:

1. A millimeter or sub-millimeter wave illumination system comprising:
   at least one primary radiation source adapted to emit radiation at one or more wavelengths in at least one radiation field state;
   a baffle comprising a non-transmissive surface and having a plurality of transmissive exit apertures positioned therein;
   a surface reflective at millimeter or sub-millimeter wavelengths for inducing a plurality of radiation paths between the source and the baffle, wherein said baffle and said reflective surface forms a portion of a container into which said at least one primary radiation source emits radiation; and
   means for generating a plurality of radiation field states in a pre-determined time interval.

2. An illumination system as claimed in claim 1 wherein the means for generating is arranged to change the radiation field states within a time shorter than a basic integration period of an associated imaging system.

3. An illumination system as claimed in claim 1 wherein the means for generating includes a mechanical actuator attached such that said actuator is arranged to move the reflective surface.

4. An illumination system as claimed in claim 1 wherein the means for generating incorporates a moveable structure for disturbing an electromagnetic field between the source and the baffle.

5. An illumination system as claimed in claim 4 wherein the moveable structure comprises a reflective material.

6. An illumination system as claimed in claim 4 wherein the moveable structure comprises an absorptive material.

7. An illumination system as claimed in claim 4 wherein the moveable structure comprises a dielectric material.

8. An illumination system as claimed in claim 1 wherein the means for generating comprises means for changing the effective point at which the primary source provides an output of radiation towards the baffle and the reflective surface.

9. An illumination system as claimed in claim 8 wherein the means for changing the effective point at which the primary source provides an output of radiation comprises a primary source output adapted to be moveable with respect to the reflecting surface and the baffle.

10. An illumination system as claimed in claim 8 wherein the means for changing the effective point at which the primary source provides an output of radiation comprises a switch arranged to switch radiation from the primary source to one of a plurality of spatially separate outputs.

11. A method of generating millimeter or sub-millimeter wave illumination comprising the steps of:
   feeding millimeter or sub-millimeter wave radiation from at least one primary source towards a reflecting surface and a baffle, the baffle comprising a non-transmissive surface and having positioned therein a plurality of transmissive exit apertures, such that the reflecting surface induces a plurality of radiation paths between the source and the baffle; and
   generating a plurality of radiation field states between the source and the exit apertures over a pre-determined time interval.

12. A millimeter or sub-millimeter wave illumination system comprising:
   at least one primary radiation source adapted to emit radiation at one or more wavelengths in at least one radiation field state;
   a baffle comprising a non-transmissive surface and having positioned therein a plurality of transmissive exit apertures;
   a surface reflective at millimeter or sub-millimeter wavelengths for inducing a plurality of radiation paths between the source and the baffle; and
   a generator for generating a plurality of radiation field states in a pre-determined time interval.

* * * * *